United States Patent
Laor et al.

(10) Patent No.: US 9,367,341 B2
(45) Date of Patent: Jun. 14, 2016

(54) ENCRYPTING AND DECRYPTING VIRTUAL DISK CONTENT USING A SINGLE USER SIGN-ON

(75) Inventors: Dor Laor, Tel Aviv (IL); Izik Eidus, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 727 days.

(21) Appl. No.: 12/750,267

(22) Filed: Mar. 30, 2010

(65) Prior Publication Data

US 2011/0246786 A1   Oct. 6, 2011

(51) Int. Cl.
*G06F 9/455* (2006.01)
*G06F 21/62* (2013.01)

(52) U.S. Cl.
CPC ........ *G06F 9/45533* (2013.01); *G06F 21/6227* (2013.01)

(58) Field of Classification Search
CPC .................... G06F 9/45533; G06F 21/6227
USPC .............................. 713/189; 718/1; 726/1–21
See application file for complete search history.

(56) References Cited

U.S. PATENT DOCUMENTS

| 7,594,276 | B2 * | 9/2009 | Grawrock et al. ............ 726/27 |
| 8,117,314 | B2 * | 2/2012 | Croft et al. .................... 709/227 |
| 8,281,018 | B2 | 10/2012 | Heim et al. |
| 8,341,213 | B2 | 12/2012 | Heim |
| 8,738,781 | B2 | 5/2014 | Heim et al. |
| 2005/0138373 | A1 * | 6/2005 | Clark ..................... G06F 21/31 713/166 |
| 2007/0180447 | A1 | 8/2007 | Mazzaferri et al. |

OTHER PUBLICATIONS

Goyal et al. Publication CCS 2006—Attribute-Based Encryption for Fine-Grained Access Control of Encryption Data.*

* cited by examiner

*Primary Examiner* — Kaveh Abrishamkar
*Assistant Examiner* — Tri Tran
(74) *Attorney, Agent, or Firm* — Lowenstein Sandler LLP (57) ABSTRACT

A mechanism for automatically encrypting and decrypting virtual disk content using a single user sign-on is disclosed. A method of embodiments of the invention includes receiving credentials of a user of a virtual machine (VM) provided as part of a single sign-on process to access the VM, referencing a configuration database with the received credentials of the user, determining encryption and decryption policy settings for the VM from the configuration database, and at least one of encrypting or decrypting, by the VM, files of the VM based on the determined encryption and decryption policy settings.

17 Claims, 5 Drawing Sheets

Receive user credentials at a VM as part of single sign-on process
310

Utilizing the received credentials, reference a configuration database to determine decryption policy settings for the VM
320

Monitor VM for events that trigger an auto-decryption operation
330

Based on the determined decryption policy settings, decrypt all indicated files of the VM
340

ENCRYPTING AND DECRYPTING VIRTUAL DISK CONTENT USING A SINGLE USER SIGN-ON

TECHNICAL FIELD

The embodiments of the invention relate generally to virtualization systems and, more specifically, relate to automatically encrypting and decrypting virtual disk content using a single user sign-on.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a VM monitor, or a "VMM") to present to each OS a "VM" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization machines.

The virtualization technologies have wide applications in the computer field with the development of computer systems. For example, such virtualization technologies can be used to implement a virtual desktop application which runs within a VM of a host and accessed from a client over a network, such as, for example, RHEV-M available from Red Hat, Inc. of Raleigh, N.C.

Typically, in such a configuration, after a client machine starts up, a user has to log onto a Web portal via a Web browser to select a VM (e.g., a virtual desktop) to be launched and accessed by the client. That is, the user needs to be authenticated both against the web portal to get a list of Vms, and afterward against the VM logon process. Usually on enterprise installations, both the web portal and the VM credential are kept in a centralized directory service. However, mechanisms exist today that allow for a single sign-on procedure for the user of a VM. The single sign-on procedure allows a user of the VM to be authenticated at a controller managing the VM and subsequently having the user's credentials passed on to an active directory server for use in further authentication procedures for the user without the user's knowledge and having to participate in additional sign-on procedures.

Currently, single sign-on mechanisms do not encompass additional security features that a VM may want to implement to protect the files of the VM. For instance, if additional security for the files of the VM, such as encryption and decryption of those files is desired, then additional time may be spent providing credentials for that security and managing the security process. As such, a mechanism to integrate security features for files of a VM, such as encryption and decryption of such files, with the single sign-on process for the VM would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for automatically encrypting and decrypting virtual disk content using a single user sign-on. A method of embodiments of the invention includes receiving credentials of a user of a virtual machine (VM) provided as part of a single sign-on process to access the VM, referencing a configuration database with the received credentials of the user, determining encryption and decryption policy settings for the VM from the configuration database, and at least one of encrypting or decrypting, by the VM, files of the VM based on the determined encryption and decryption policy settings.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for automatically encrypting and decrypting virtual disk content using a single user sign-on. Embodiments of the invention extend the single sign-on process to include and automate the additional security of encryption and decryption of files associated with a VM. Specifically, embodiments of the invention bootstrap onto the existing single sign-on process another process to authenticate for and automatically perform encryption and decryption according to configurations established beforehand at a controller.

Figure 1:
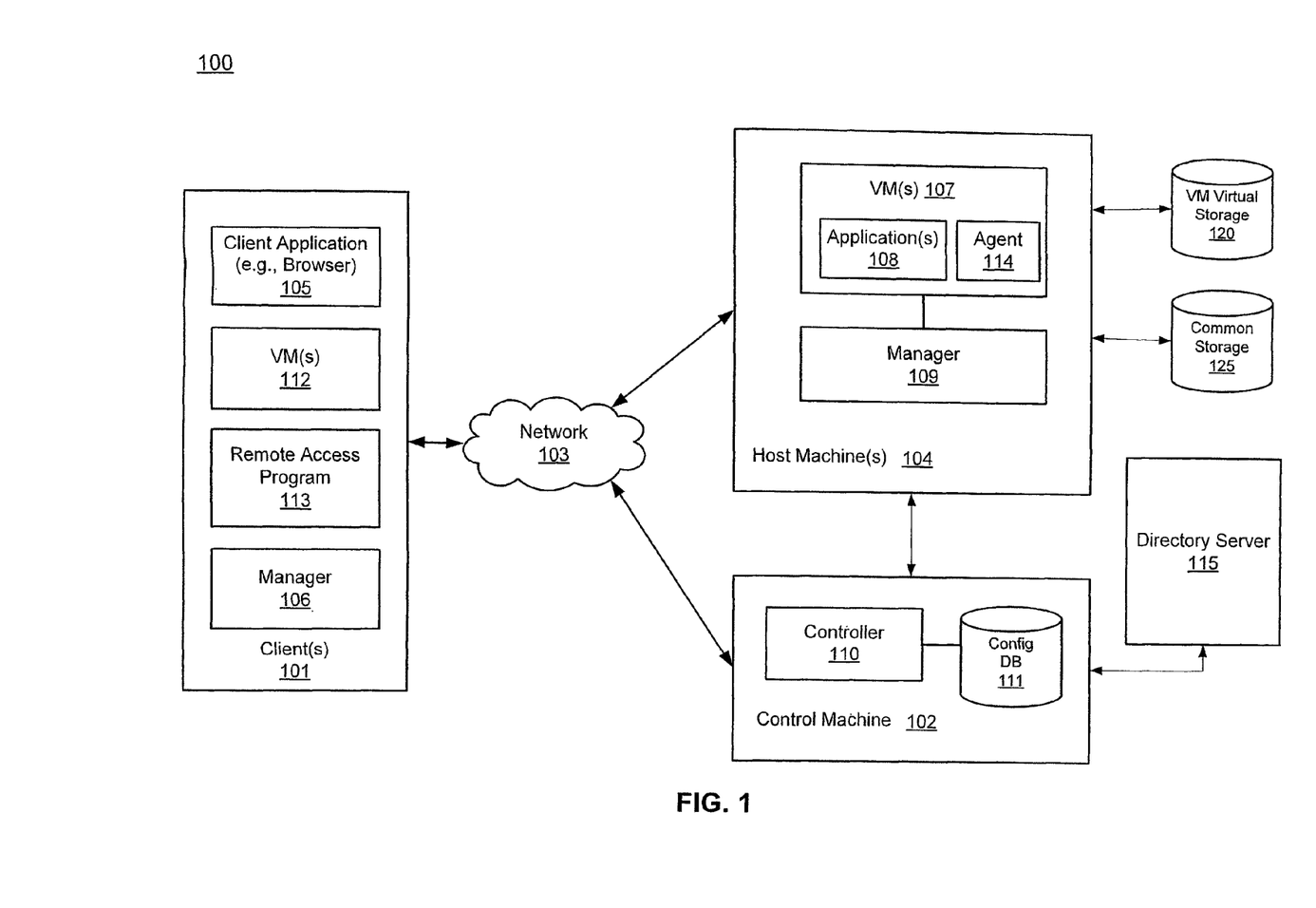
FIG. 1 is a block diagram illustrating an example of a network configuration according to one embodiment of the invention.

FIG. 1 is a block diagram illustrating an example of a network configuration according to one embodiment of the invention. Referring to FIG. 1, network configuration 100 includes, but is not limited to, one or more clients 101 communicatively coupled to a remote server or a cluster of host machines 104 over a network 103. Network 103 may be a local area network (LAN) or a wide area network (WAN) and may be a combination of one or more networks. Client 101 can be any computer system in communication with host machine 104 for remote execution of applications at host machine 104.

Generally, a client, such as client 101, can be a computer system in communication with host machine 104 for remote execution of applications hosted by host machine 104. Thus, input data (e.g., mouse and keyboard input) representing application commands is received at the client and transferred over network 103 to host machine 104. In response to client side data, an application (e.g., desktop application 108) can generate output display commands in the form of executable instructions. The output display commands can then be transmitted with an optional compression back to the remote client and a remote display driver of the remote client can collect the commands and generate corresponding commands for rendering at a display device of the client. Note that a desktop application is utilized herein as an example; however, any other application may also be applied.

In one embodiment, host machine 104 is configured to host one or more VMs (VMs) 107, each having one or more desktop applications 108 (e.g., desktop operating system). Desktop application 108 may be executed and hosted by an operating system within a VM 107. Such an operating system in VM 107 is also referred to as a guest operating system. Multiple guest operating systems and the associated VMs may be controlled by another operating system (also referred to as a host OS). Typically, a host OS represents a VM monitor (VMM) (also referred to as a hypervisor) for managing the hosted VMs. A guest OS may be of the same or different type with respect to the host OS. For example, a guest OS may be a Windows™ operating system from Microsoft and a host OS may be a Linux operating system available from Red Hat.

VM 107 can be any type of VM, such as, for example, hardware emulation, full virtualization, para-virtualization, and operating system-level virtualization VMs. Different VMs 107 hosted by host machine 104 may have the same or different privilege levels for accessing different resources.

In some embodiments, system 100 may be implemented as part of a server or a cluster of servers within a data center of an enterprise entity. It allows enterprises the benefit of centralized desktops without the need to change their applications or infrastructure. Enterprises benefit from an improvement in the manageability, security and policy enforcement for their desktop environment, and consequently, realize a significant reduction in the desktop TCO (total cost of ownership). In other embodiments, system 100 may be implemented in a single machine, which both controls and hosts VMs 107.

In one embodiment, host machine 104 and client 101 may be managed by a control machine 102 (also referred to as a management server or system). For example, in one embodiment, host machine 104 may be implemented as a VDS (virtual desktop server) while control machine 102 may be implemented as a VDC (virtual desktop controller) server.

Figure 2:
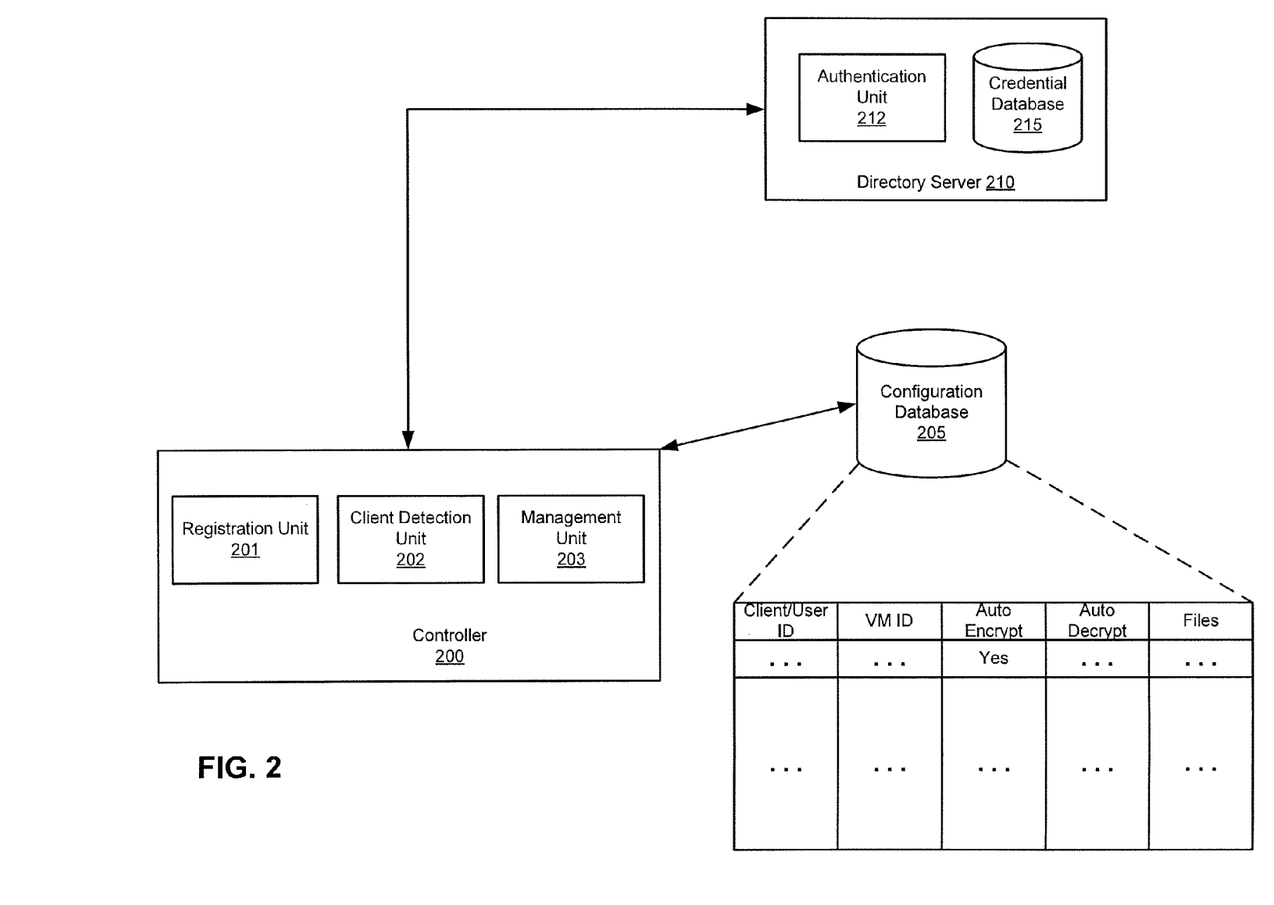
FIG. 2 is a block diagram illustrating an example of a control machine according to one embodiment.

Referring back to FIG. 1 according to one embodiment, prior to launching a VM 107, the VM is defined and configured within control machine 102, for example, by an administrator. For example, a VM 107 may be defined and configured to be associated with client 101 and/or a user of client 101. Such configuration information may be stored in a configuration database 111 of control machine 102. An example of the configuration database is shown in FIG. 2.

When client 101 is registered with control machine 102, client 101 may be identified via its IP address, name, UUID (universally unique identifier), or other stronger mechanisms (e.g., a locally installed agent with a certificate). Note that a client 101 does not have to be specifically registered with the system. Rather, a client 101 can be identified by a range definition or a wildcard, etc. that represents one or more groups of clients. That is, a client 101 may register as a member of one or more groups of clients (e.g., a member of a particular domain). Each group of clients may be associated with one or more VMs or a pool of VMs.

During initialization of a VM 107, a single sign-on process for the VM 107 may be implemented so that an user of the VM 107 at client 101 does not have to provide credentials multiple times in order to access and use the VM 107. The sign-on by a user is necessary to verify the authenticity of a user wanting to access a VM 107. The sign-on procedure provides security for system 100. Before the implementation of the single sign-on process, an user may have been required to provide their credentials multiple times to authenticate at the client 101, the control machine 102, and at the logon process running inside the VM OS (e.g., Microsoft™ Windows™ logon process), to name a few examples. However, with the advent of the single sign-on process, the credentials of the user, once provided and authenticated, are automatically passed between these components so that the user can experience improved performance and less interruption from system 100.

Embodiments of the invention extend the single sign-on process to include and automate the additional security of encryption and decryption of files associated with a VM 107. Previously, to enable the additional security of encrypting and decrypting individual files associated with a VM 107, additional authentication steps were required, as well as cumbersome management responsibilities, to identify and configure the particular files to be encrypted and/or decrypted. However, embodiments of the invention bootstrap, onto the existing single sign-on process, another process to authenticate for and automatically perform encryption and decryption per user according to configurations established beforehand at a controller.

Referring back to FIG. 1, when client 101 starts up, a management module 106 running within client 101 may communicate with control machine 102, indicating that the client 101 is starting up. For example, management module 106 may be implemented as a part of communication stack, such as a SPICE™ agent. In one embodiment, management module 106 may optionally be configured to subsequently launch a remote access program such as a SPICE session to access a VM. Alternatively, controller 110 may periodically poll (e.g., ping) client 101 in order to determine whether client 101 is starting up.

For example, a management system such as control machine 102 can periodically ping a client to detect whether the client is starting up. Typically, a communication stack of a client such as a TCP/IP stack usually can start responding to the ping before the client finishes the entire startup process and is available for a user to start working at the client. Alternatively, the management system may be notified by a local agent (e.g., manager 106 of client 101) installed on the client (and configured to start as early as possible) that the client is going up (or the management system periodically polls the agent for such an indication).

When a user initially attempts to start a VM 107, they are provided with a connection to control machine 102. Over this connection, the controller 110 requests the user's identification and password for authentication with directory server 115. In one embodiment, the directory server 115 may be a Kerberos server, a Microsoft™ Active Directory server, or any other standard means of authentication. The directory server 115 authenticates the user via a supplied ID and password from the user, and informs the controller 110 of this authentication. As part of a single sign-on process, the controller 110 allows the user to proceed with starting the VM 107 and, in some cases, provides the user with a list of VMs 107, which the user is authenticated against, to select for start up. At this point, the authenticated credentials are automatically passed from the controller 110 to the host machine 104 that runs the selected VM 107, as well as to the hypervisor (not shown) managing that VM 107 for use in future authentications.

Embodiments of the invention then utilize the provided credentials for encryption and decryption purposes. In one embodiment, the VM may be automatically configured, with reference to configuration database 111, to decrypt encrypted files associated with the VM when the VM is detected starting up (e.g., having an "auto decrypt" flag or option enabled as shown in FIG. 2). Alternatively, during operations, if it is detected that a VM is down or suspended, the VM may be automatically configured to encrypt files associated with the VM. Embodiments of the invention utilize the credentials passed through from the single sign-on process to authenticate and enable this automated decryption and encryption processes.

An agent 114 on the VM automatically goes to the virtual disk or directories in the virtual disk and decrypts the disk or directories 120, 125 using the credentials or key that was supplied in the log-on process and subsequently supplied by the organization directory server 115. This automated encryption and decryption may be configured via policy settings at the controller 110. An administrator can set a policy dictating that every user has his/her own private directory encrypted and subsequently this will happen every time the user is logged into the VM 107, without the user even knowing. The files that are encrypted/decrypted in embodiments of the invention may be dependent on established policy. For instance, the encryption/decryption may apply to the entire disk 120, 125 or just portions of the disk. In some cases, the user may dictate which files are encrypted and decrypted. Note that the credentials for the encryption/decryption process might be different than the ones needed for authenticating against the directory server 115. The guest agent 114 and the configuration DB 111 are able to manage these different credentials themselves.

In embodiments of the invention, every time a user is logged into a VM 107, the VM's 107 directories or virtual hard disks will be decrypted and each time a user disconnects from the VM, all of the data will be encrypted again. For example, today every time a user is disconnected, we automatically lock up the screen of the VM (this is implemented).

The automated encryption and decryption of embodiments of the invention based on the provided user credentials allows all data inside a virtual disk to be automatically encrypted so that no one can access data even if they gain access to the physical files and the information itself. Without the utilization of the single sign-on process, such automated encryption/decryption becomes difficult due to the additional passwords and knowledge required to accomplish the encryption/decryption process.

FIG. 2 is a block diagram illustrating an example of a control machine 200 according to one embodiment. For example, controller 200 may be implemented as part of controller 110 of FIG. 1 and configuration database 205 may be implemented as part of database 111 of FIG. 1. Note that some or all of the components as shown in FIG. 2 may be implemented in software, hardware, or a combination of both. In one embodiment, controller 200 includes, but is not limited to, a registration unit 201, a client detection unit 202, and a management unit 203.

In one embodiment, management unit 203 is configured to automatically provide a log-in screen for a user of the client. When credentials are received from the user at the control machine, the management unit 203 communicates with directory server 210 to accomplish authentication of the user.

Directory server 210 utilizes an authentication unit 212 to perform authentication logic that references a credentials database 215 to authenticate the user's provided credentials. Once the user has selected a VM to initialize, the controller is further responsible for enabling the auto-encryption and auto-decryption of embodiments of the invention. The controller passes along the provided user credentials to the VM selected by the user for initialization. Utilizing these credentials, as well as directives from the controller, the VM automatically decrypts virtual disk content associated with the selected VM. The directives from the controller include indications whether the VM is to be auto-decrypted and auto-encrypted, as well as which files should be auto-decrypted and auto-encrypted. In one embodiment, this information is stored in a configuration database 205 of controller 200. As previously mentioned this information may be specified by the user or set via an administrative policy at the controller 200.

Figure 3:
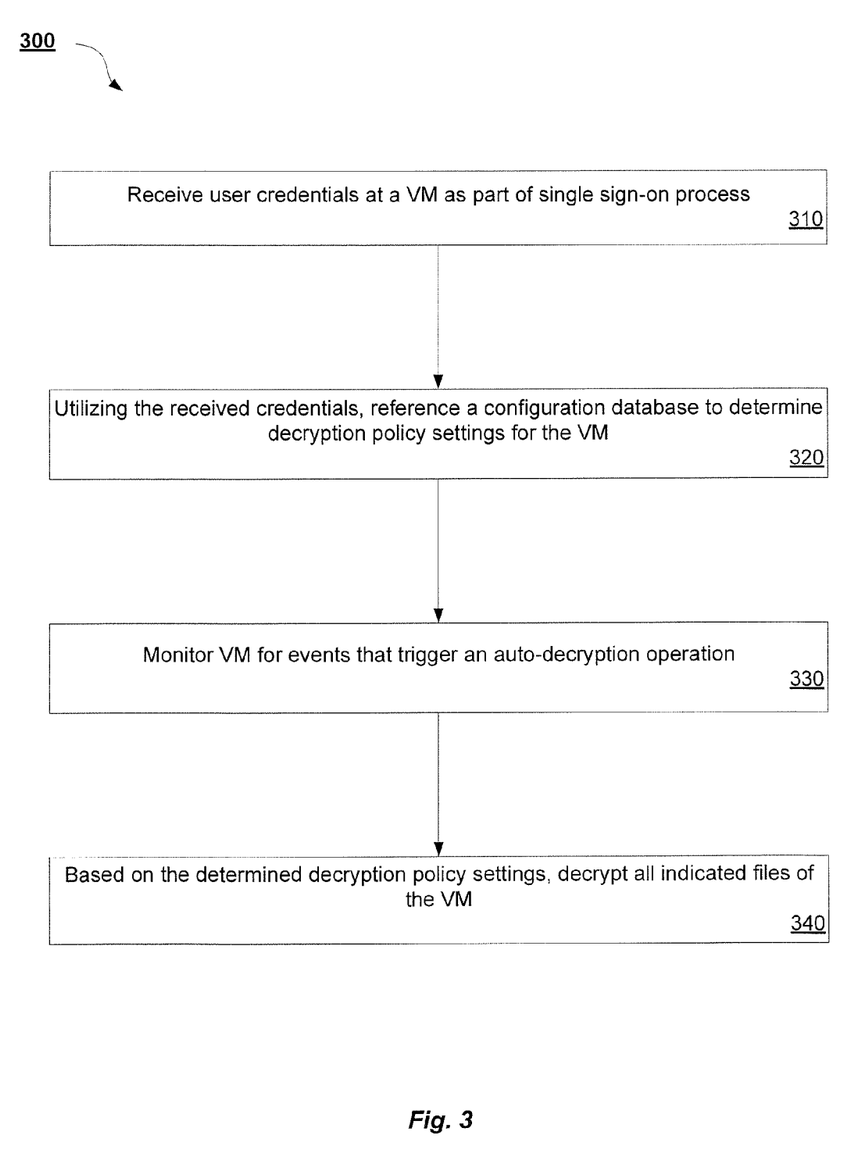
FIG. 3 is a flow diagram illustrating a method for automatically decrypting virtual disk content using a single user sign-on according to an embodiment of the invention.

FIG. 3 is a flow diagram illustrating a method 300 for automatically decrypting virtual disk content using a single user sign-on according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by control machine 102 of FIG. 1.

Method 300 begins at block 310 where user credentials are received at a VM as part of a single sign-on process. In one embodiment, the VM receives the credentials as part of its initialization process on a host machine. Then, at block 320, the VM references a configuration database utilizing the received credentials. The configuration database is referenced to determine a decryption policy settings for the VM. In one embodiment, the policy settings may include options such as auto-encrypt, auto-decrypt, the files to be encrypted and/or decrypted, and the events that can trigger an auto-encrypt or auto-decrypt.

Subsequently, at block 330, the VM is monitored for events that trigger an auto-decryption operation. In one embodiment, such events may include an initial authenticated login, an awakening from a shutdown operation, an awakening from a hibernation operation, or a return from an idle state for a predetermined period of time. Then, at block 340, if an auto-decryption event is triggered, then all indicated files on the VM are decrypted based on the determined decryption policy settings.

Figure 4:
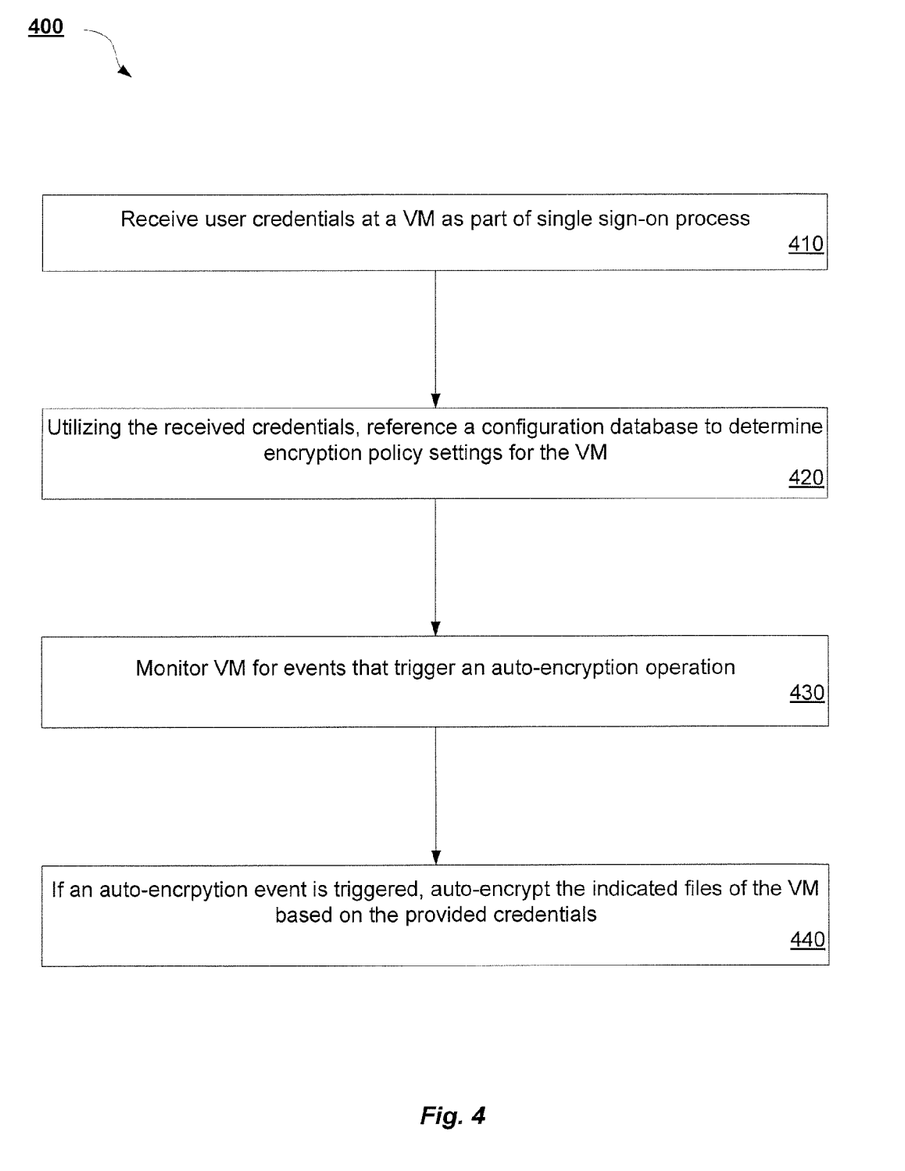
FIG. 4 is a flow diagram illustrating a method for automatically encrypting virtual disk content using a single user sign-on according to an embodiment of the invention.

FIG. 4 is a flow diagram illustrating a method 400 for automatically encrypting virtual disk content using a single user sign-on according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by control machine 102 of FIG. 1.

Method 400 begins at block 410 where user credentials are received at a VM as part of a single sign-on process. In one embodiment, the VM receives the credentials as part of its initialization process on a host machine. Then, at block 420, the VM references a configuration database utilizing the received credentials. The configuration database is referenced to determine encryption policy settings for the VM. In one embodiment, the policy settings may include options such as auto-encrypt, auto-decrypt, the files to be encrypted and/or decrypted, and the events that can trigger an auto-encrypt or auto-decrypt.

Subsequently, at block 430, the VM is monitored for events that trigger an auto-encryption operation. In one embodiment, such events may include a shutdown operation, a hibernation operation, or an idle state for a predetermined period of time. Lastly, at block 440, if an auto-encryption event is triggered, then all indicated files of the VM are encrypted based on the determined policy settings for the VM utilizing the provided credentials.

Figure 5:
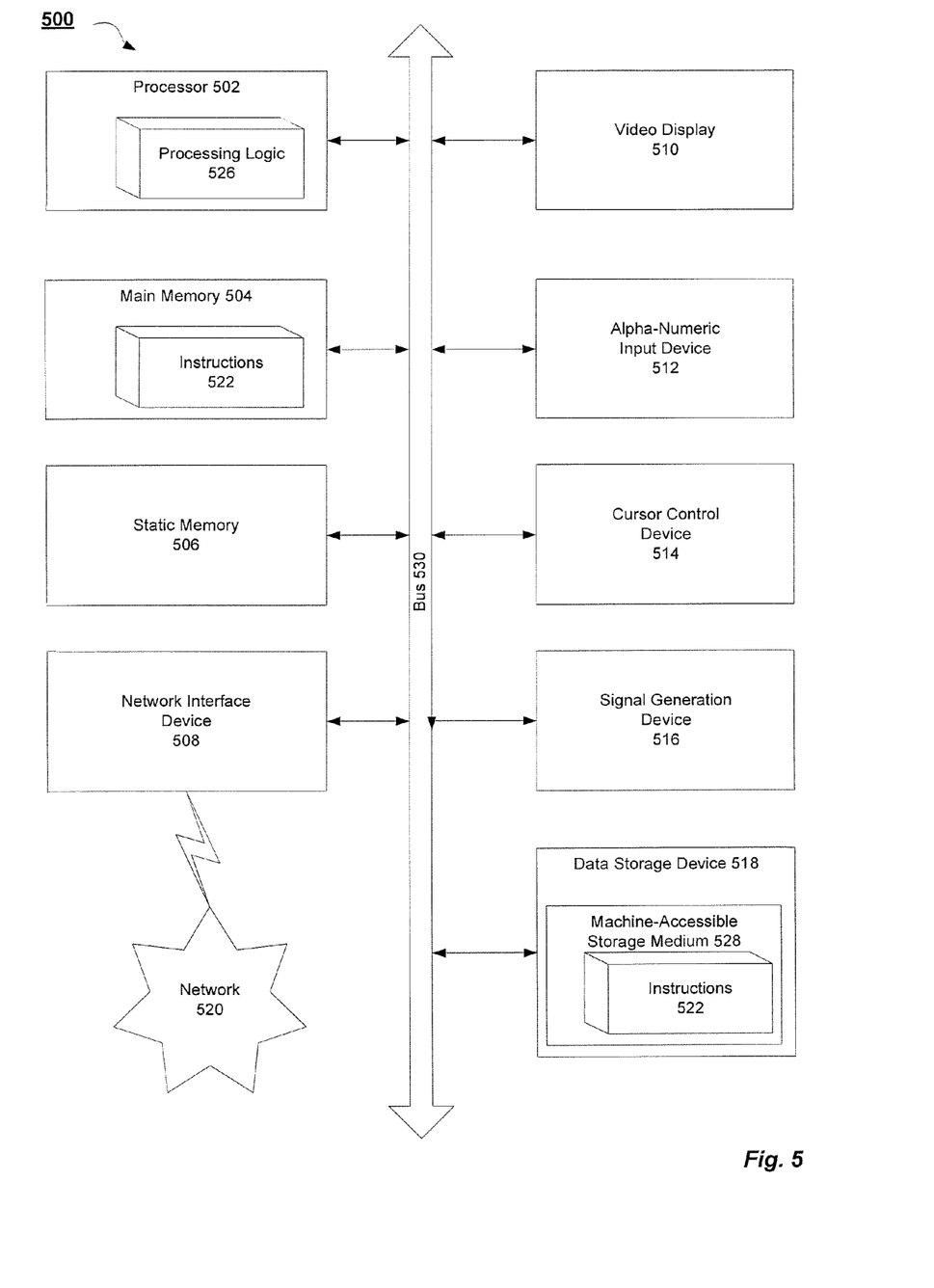
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform automatically encrypting and decrypting virtual disk content using a single user sign-on by virtual machine 107 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform method 300 for automatically encrypting and decrypting virtual disk content using a single user sign-on described with respect to FIG. 3, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   initializing, by a processing device of a host machine executing a virtual machine (VM), operations at the VM in response to authentication of the VM by a host controller machine via a single sign-on process that utilizes credentials of a user of the VM provided to the host controller machine by the user, wherein the host controller machine to define and configure the host machine and the VM and to manage the sign-on process for the VM, and wherein the host controller machine is separate from the host machine and separate from a directory server that authenticates the provided credentials of the VM for the host controller machine;
   receiving, by the VM subsequent to the user signing-on to the VM using the credentials via the single sign-on process and subsequent to initializing the VM, the credentials of the user of the VM from a hypervisor executing on the host machine and managing the VM, the credentials sent from the host controller machine to the hypervisor without interaction from the user and after the host controller machine successfully authenticates the VM using the credentials;
   referencing, by the VM subsequent to initializing the VM and subsequent to receiving the credentials at the VM, a configuration database of the host controller machine with the received credentials of the user to authenticate the credentials, the configuration database maintained by the host controller machine and storing encryption and decryption policy settings for the VM, the encryption and decryption policy settings comprising other credentials used for encrypting and decrypting for the VM;
   determining, by the VM subsequent to referencing the configuration database, the encryption and decryption policy settings for the VM from the configuration database in view of the received credentials;
   detecting one or more events that trigger at least one of an auto-encrypt or an auto-decrypt operation, wherein at least one of the events comprises an idle state of the VM for a determined period of time; and
   in response to detecting the one or more events, utilizing the received credentials of the user that were provided for the single sign-on process without requesting or receiving the other credentials of the user directly from the user to at least one of encrypting or decrypting, by the VM subsequent to determining the encryption and decryption policy settings, an entire virtual hard disk of the VM in view of the determined encryption and decryption policy settings, wherein the received credentials authenticate and enable the at least one of the encrypting or the decrypting.

2. The method of claim 1, wherein the encryption and decryption policy settings comprise an auto-encrypt flag, an auto-decrypt flag, identification of which files of the VM the policy settings apply, and identification of events that trigger auto-encrypt and auto-decrypt operations.

3. The method of claim 2, further comprising monitoring the VM for one or more of the events that trigger at least one of an auto-encrypt or an auto-decrypt operation.

4. The method of claim 3, wherein the events that trigger an auto-encrypt and auto-decrypt operations further comprise at least one of a shutdown operation of the VM, a hibernation operation of the VM, or a client being disconnected from the VM.

5. The method of claim 1, wherein the provided credentials of the user from the single sign-on process are used by the VM to authenticate the user for the at least one of auto-encryption or auto-decryption of the files of the VM.

6. The method of claim 5, wherein the directory server is communicably coupled with the host machine hosting the VM to perform authentication of the provided credentials of the user for the at least one of auto-encryption or auto-decryption of the files of the VM.

7. A system, comprising:
   a processing device;
   a memory communicably coupled to the processing device; and
   a virtual machine (VM) executable from the memory by the processing device to:
     initialize operations at the VM in response to authentication of the VM by a host controller machine via a single sign-on process that utilizes credentials of a user of the VM provided to the host controller machine by the user, wherein the host controller machine to define and configure the host machine and the VM and to manage the sign-on process for the VM, and wherein the host controller machine is separate from the host machine and separate from a directory server that authenticates the provided credentials of the VM for the host controller machine;
     receive, subsequent to the user signing-on to the VM using the credentials via the single sign-on process and subsequent to initializing the VM, the credentials of the user of the VM from a hypervisor executing on the host machine and managing the VM, the credentials sent from the host controller machine to the hypervisor without interaction from the user and after the host controller machine successfully authenticates the VM using the credentials;
     reference, subsequent to initializing the VM and subsequent to receiving the credentials at the VM, a configuration database of the host controller machine with the received credentials of the user to authenticate the credentials, the configuration database maintained by the host controller machine and storing encryption and decryption policy settings for the VM, the encryption and decryption policy settings comprising other credentials used for encrypting and decrypting for the VM;

determine, subsequent to referencing the configuration database, the encryption and decryption policy settings for the VM from the configuration database in view of the received credentials;

detect one or more events that trigger at least one of an auto-encrypt or an auto-decrypt operation, wherein at least one of the events comprises an idle state of the VM for a determined period of time; and in response to the detection of the one or more events, utilize the received credentials of the user that were provided for the single sign-on process without requesting or receiving the other credentials of the user directly from the user to at least one of encrypt or decrypt, subsequent to determining the encryption and decryption policy settings, an entire virtual hard disk of the VM in view of the determined encryption and decryption policy settings, wherein the received credentials authenticate and enable the at least one of the encryption or decryption.

8. The system of claim 7, wherein the encryption and decryption policy settings comprise an auto-encrypt flag, an auto-decrypt flag, identification of which files of the VM the policy settings apply, and identification of events that trigger auto-encrypt and auto-decrypt operations.

9. The system of claim 8, wherein the VM further to monitor the VM for one or more of the events that trigger at least one of an auto-encrypt or an auto-decrypt operation.

10. The system of claim 9, wherein the events that trigger an auto-encrypt and auto-decrypt operations further comprise at least one of a shutdown operation of the VM, a hibernation operation of the VM, or a client being disconnected from the VM.

11. The system of claim 7, wherein the provided credentials of the user from the single sign-on process are used by the VM to authenticate the user for the at least one of auto-encryption or auto-decryption of the files of the VM.

12. A non-transitory machine-readable storage medium comprising instructions that, when accessed by a processing device, cause the processing device to:

initialize, by the processing device on a host machine to execute a virtual machine (VM), operations at the VM in response to authentication of the VM by a host controller machine via a single sign-on process that utilizes credentials of a user of the VM provided to the host controller machine by the user, wherein the host controller machine to define and configure the host machine and the VM and to manage the sign-on process for the VM, and wherein the host controller machine is separate from the host machine and separate from a directory server that authenticates the provided credentials of the VM for the host controller machine;

receive, by the VM subsequent to the user signing-on to the VM using the credentials via the single sign-on process and subsequent to initializing the VM, the credentials of the user of the VM from a hypervisor executing on the host machine and managing the VM, the credentials sent from the host controller machine to the hypervisor without interaction from the user and after the host controller machine successfully authenticates the VM using the credentials;

reference, by the VM subsequent to initializing the VM and subsequent to receiving the credentials at the VM, a configuration database of the host controller machine with the received credentials of the user to authenticate the credentials, the configuration database maintained by the host controller machine and storing encryption and decryption policy settings for the VM, the encryption and decryption policy settings comprising other credentials used for encrypting and decrypting for the VM;

determine, by the VM subsequent to referencing the configuration database, the encryption and decryption policy settings for the VM from the configuration database in view of the received credentials;

detect one or more events that trigger at least one of an auto-encrypt or an auto-decrypt operation, wherein at least one of the events comprises an idle state of the VM for a determined period of time; and in response to the detection of the one or more events utilize the received credentials of the user that were provided for the single sign-on process without requesting or receiving the other credentials of the user directly from the user to at least one of encrypt or decrypt, by the VM subsequent to determining the encryption and decryption policy settings, an entire virtual hard disk of the VM in view of the determined encryption and decryption policy settings, wherein the received credentials authenticate and enable the at least one of the encryption or decryption.

13. The non-transitory machine-readable storage medium of claim 12, wherein the encryption and decryption policy settings comprise an auto-encrypt flag, an auto-decrypt flag, identification of which files of the VM the policy settings apply, and identification of events that trigger auto-encrypt and auto-decrypt operations.

14. The non-transitory machine-readable storage medium of claim 13, wherein the processing device is further to monitor the VM for one or more of the events that trigger at least one of an auto-encrypt or an auto-decrypt operation comprising at least one of a shutdown operation of the VM, a hibernation operation of the VM, or a client being disconnected from the VM.

15. The non-transitory machine-readable storage medium of claim 12, wherein the provided credentials of the user from the single sign-on process are used by the VM to authenticate the user for the at least one of auto-encryption or auto-decryption of the files of the VM.

16. The system of claim 11, wherein a directory server is communicably coupled with the host machine hosting the VM to perform authentication of the provided credentials of the user for the at least one of auto-encryption or auto-decryption of the files of the VM.

17. The non-transitory machine-readable storage medium of claim 15, wherein a directory server is communicably coupled with the host machine hosting the VM to perform authentication of the provided credentials of the user for the at least one of auto-encryption or auto-decryption of the files of the VM.

* * * * *